(12) United States Patent
Wu (10) Patent No.: US 12,022,150 B2
(45) Date of Patent: Jun. 25, 2024

(54) BULLET COMMENT PROCESSING METHOD AND SYSTEM BASED ON WeChat MINI-PROGRAM

(71) Applicant: SHANGHAI BILIBILI TECHNOLOGY CO., LTD., Shanghai (CN)

(72) Inventor: Xiuran Wu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 94 days.

(21) Appl. No.: 17/779,494

(22) PCT Filed: Mar. 26, 2020

(86) PCT No.: PCT/CN2020/081500
§ 371 (c)(1),
(2) Date: May 24, 2022

(87) PCT Pub. No.: WO2021/103366
PCT Pub. Date: Jun. 3, 2021

(65) Prior Publication Data
US 2023/0007337 A1  Jan. 5, 2023

(30) Foreign Application Priority Data
Nov. 25, 2019  (CN) .......................... 201911166906.X (51) Int. Cl.
*H04N 21/431*  (2011.01)
*H04N 21/488*  (2011.01)

(52) U.S. Cl.
CPC ..... *H04N 21/4316* (2013.01); *H04N 21/4886* (2013.01)

(58) Field of Classification Search
CPC ....................... H04N 21/4316; H04N 21/4886
See application file for complete search history.

(56) References Cited

U.S. PATENT DOCUMENTS

2014/0012910 A1 *  1/2014  White ................ H04N 21/4355
709/204
2014/0337126 A1 *  11/2014  Ohanyan ............ G06Q 30/0251
705/14.49
(Continued)

FOREIGN PATENT DOCUMENTS

CN       106792086 A    5/2017
CN       107092643 A    8/2017
(Continued)

OTHER PUBLICATIONS

International Patent Application No. PCT/CN2020/081500; Int'l Search Report; dated Aug. 26, 2020; 3 pages.
(Continued)

*Primary Examiner* — Kyu Chae
(74) *Attorney, Agent, or Firm* — BakerHostetler (57) ABSTRACT

The present disclosure describes techniques of processing bullet comments. The techniques comprise obtaining a page of playing a video for outputting a video stream; obtaining a plurality of pieces of bullet comment data associated with the video stream; and performing a bullet comment processing operation with a predetermined time interval, where the bullet comment processing operation includes performing bullet comment processing at a logical layer on the plurality of pieces of bullet comment data. In the embodiments of the present application, a balanced time interval may be set as the predetermined time interval to regularly perform a bullet comment processing operation, so that smoothness of displaying bullet comments and proper use of computing resources are ensured.

13 Claims, 6 Drawing Sheets

(56) References Cited

U.S. PATENT DOCUMENTS

| | | | |
|---|---|---|---|
| 2017/0264585 A1 | 9/2017 | Xu et al. | |
| 2018/0144377 A1* | 5/2018 | Patenaude | H04W 4/02 |
| 2018/0255346 A1* | 9/2018 | Guo | H04N 21/4858 |
| 2018/0316632 A1* | 11/2018 | Zhu | H04L 67/02 |

FOREIGN PATENT DOCUMENTS

| | | |
|---|---|---|
| CN | 107360459 A | 11/2017 |
| CN | 108319483 A | 7/2018 |
| CN | 108804164 A | 11/2018 |
| CN | 110333859 A | 10/2019 |
| CN | 110333912 A | 10/2019 |

OTHER PUBLICATIONS

Tao Zi et al.; https://www.cnblogs.com/buxizhizhoum/p/7448641.html; CNblogs; © 2022; accessed May 24, 2022; 17 pages.

"Retrofit REST-Framework, the custom decorator specifies a separate Serializer for each Action in the ViewSet"; https://blog.dennic365.com/?p=87?p=87; Dennic; © 2022; accessed May 24, 24 pages.

"WeChat applet video barrage effect"; https://www.cnblogs.com/taoliejun/p/8820213.html; CNblogs; © 2022; accessed May 24, 2022; 10 pages.

\* cited by examiner

BULLET COMMENT PROCESSING METHOD AND SYSTEM BASED ON WeChat MINI-PROGRAM

The present application is the U.S. National Stage of International Application No. PCT/CN2020/081500, filed on Mar. 26, 2020, which claims the priority of the Chinese Patent Application No. 201911166906.X, filed on Nov. 25, 2019, and entitled "WeChat Mini Program based Bullet Comment Processing Method and System, both of which are incorporated herein by reference in their entireties.

TECHNICAL FIELD

Embodiments of the present application relate to the field of computers, and in particular to a WeChat mini program based bullet comment processing method, a system, a computer device, and a computer-readable storage medium.

BACKGROUND ART

Bullet comments refer to comments in the form of words, emojis, patterns, etc. presented simultaneously when a video is played. At present, bullet comments have become an important element for many viewers to watch videos and live streams. Bullet comments enable users to express their feelings upon watching programs, and read comments on the programs from other users as well, thus implementing interaction when the users watch videos.

There are some differences between a framework of a WeChat mini program and a conventional browser. The inventor has found that the differences may cause the following problems: with bullet comment rendering on a WeChat mini program-based video playback page, displaying of bullet comments is prone to be not smooth or excessive computing resources are used.

SUMMARY OF THE INVENTION

In view of this, an objective of embodiments of the present application is to provide a WeChat mini program based bullet comment processing method, a system, a computer device, and a computer-readable storage medium, to solve the technical problem that is prone to occur in bullet comment rendering on a WeChat mini program-based video playback page, which is displaying of bullet comments is not smooth or excessive computing resources are used.

An aspect of the embodiments of the present application provides a WeChat mini program based bullet comment processing method, the method including: obtaining a video playback page for outputting a video stream; obtaining a plurality of bullet comment data associated with the video stream; and performing a bullet comment processing operation at a predetermined time interval, where the bullet comment processing operation includes performing bullet comment processing at a logical layer on the plurality of bullet comment data.

Optionally, performing a bullet comment processing operation at a predetermined time interval includes: using a target function obtained by simulating a requestAnimationFrame to call a rendering function frame by frame to execute the code of the bullet comment processing operation.

Optionally, the target function includes a timing function and a callback function, wherein a time parameter in the timing function is determined according to a screen refresh rate, the target function is recursively called, and the callback function is used to call the rendering function to perform the bullet comment processing operation.

Optionally, performing a bullet comment processing operation at a predetermined time interval includes: polling, at the predetermined time interval, whether the bullet comment processing operation can be performed; and if the logical layer is in a busy state, determining that the bullet comment processing operation cannot be performed; if the logical layer is in an idle state, determining that the bullet comment processing operation can be performed.

Optionally, the bullet comment processing operation includes: traversing the plurality of bullet comment data, to query whether the plurality of bullet comment data include a bullet comment data in a to-be-posted state; if the plurality of bullet comment data include the bullet comment data in the to-be-posted state, then: adding the bullet comment data in the to-be-posted state to a queue of to-be-posted bullet comments, and notifying the view layer to perform a data update operation, to perform a first rendering operation according to the bullet comment data in the to-be-posted state; obtaining a bullet comment width of a bullet comment element resulting from the first rendering operation; determining, according to the bullet comment width of the bullet comment element, whether a bullet comment track in an idle state is included in a plurality of bullet comment tracks; and if a bullet comment track in the idle state is included in the plurality of bullet comment tracks, performing data binding on the bullet comment element, to notify the view layer to perform a data update operation to perform a second rendering operation; where the bullet comment element resulting from the second rendering operation is used for bullet comment display.

Optionally, determining, according to the bullet comment width of the bullet comment element, whether a bullet comment track in an idle state is included in a plurality of bullet comment tracks includes: determining whether a $k^{th}$ bullet comment track is empty, wherein k is a positive integer starting from 1; if the $k^{th}$ bullet comment track is empty, determining that the $k^{th}$ bullet comment track is in the idle state; if the $k^{th}$ bullet comment track is not empty, calculating a bullet comment speed of the bullet comment element according to the bullet comment width of the bullet comment element; determining, according to the bullet comment speed of the bullet comment element, whether bullet comment content of the bullet comment element would collide with the other bullet comment content in the $k^{th}$ bullet comment track; and if the bullet comment content of the bullet comment element would not collide with the other bullet comment content in the $k^{th}$ bullet comment track, determining that the $k^{th}$ bullet comment track is in the idle state; and if the bullet comment content of the bullet comment element would collide with the other bullet comment content in the $k^{th}$ bullet comment track, determining that the $k^{th}$ bullet comment track is in a congested state.

Optionally, the logical layer includes a bullet comment timeline, and the bullet comment processing operation further includes: performing an update operation on a timeline of the bullet comment timeline.

An aspect of the embodiments of the present application further provides a WeChat mini program based bullet comment processing system, the system including: a first obtaining module to obtain a video playback page for outputting a video stream; a second obtaining module to obtain a plurality of bullet comment data associated with the video stream; and a bullet comment processing module to perform a bullet comment processing operation at a predetermined time interval, where the bullet comment processing operation includes performing bullet comment processing at a logical layer on the plurality of bullet comment data.

An aspect of the embodiments of the present application further provides a computer device, the computer device including a memory, a processor, and computer-readable instructions stored on the memory and executable by the processor, upon exexuting the computer-readable instructions, the processor is used to implement the following steps: obtaining a video playback page for outputting a video stream; obtaining a plurality of bullet comment data associated with the video stream; and performing a bullet comment processing operation at a predetermined time interval, where the bullet comment processing operation includes performing bullet comment processing at a logical layer on the plurality of bullet comment data.

An aspect of the embodiments of the present application further provides a computer-readable storage medium having computer-readable instructions stored therein, where the computer-readable instructions is executable by at least one processor to cause the at least one processor to perform the following steps: obtaining a video playback page for outputting a video stream; obtaining a plurality of bullet comment data associated with the video stream; and performing a bullet comment processing operation at a predetermined time interval, where the bullet comment processing operation includes performing bullet comment processing at a logical layer on the plurality of bullet comment data.

According to a WeChat mini program based bullet comment processing method, a system, the device, and the computer-readable storage medium provided in the embodiments of the present application, a balanced time interval may be set as the predetermined time interval, to regularly perform a bullet comment processing operation, so that smoothness of the bullet comments and a proper use of computing resources are ensured, thereby avoiding various problems caused by a bullet comment processing operation in an irregular state, for example, displaying of bullet comments is not smooth or excessive computing resources are used.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

The inventor has found that the framework of a WeChat mini program is different from the framework of a usual browser. For example, an API similar to a requestAnimationFrame (animation frame rendering) API in a browser is not provided in the framework of the WeChat mini program. The requestAnimationFrame uses a refreshing mechanism of the screen, in which provided is a fixed screen refresh rate (60 Hz or 75 Hz), such that for example, repaint can be performed at most only 60 times or 75 times per second. The requestAnimationFrame mechanism perform page repaint synchronously with the refresh rate, that is, page repaint is performed about every 16.7 milliseconds. Since the foregoing requestAnimationFrame API does not exist in the framework of the WeChat mini program, various problems, such as unsmooth displaying of bullet comments or excessive usage of computing resources, are prone to occur in rendering. The embodiments are intended to solve these problems, and are disclosed specifically as follows.

Figure 1:
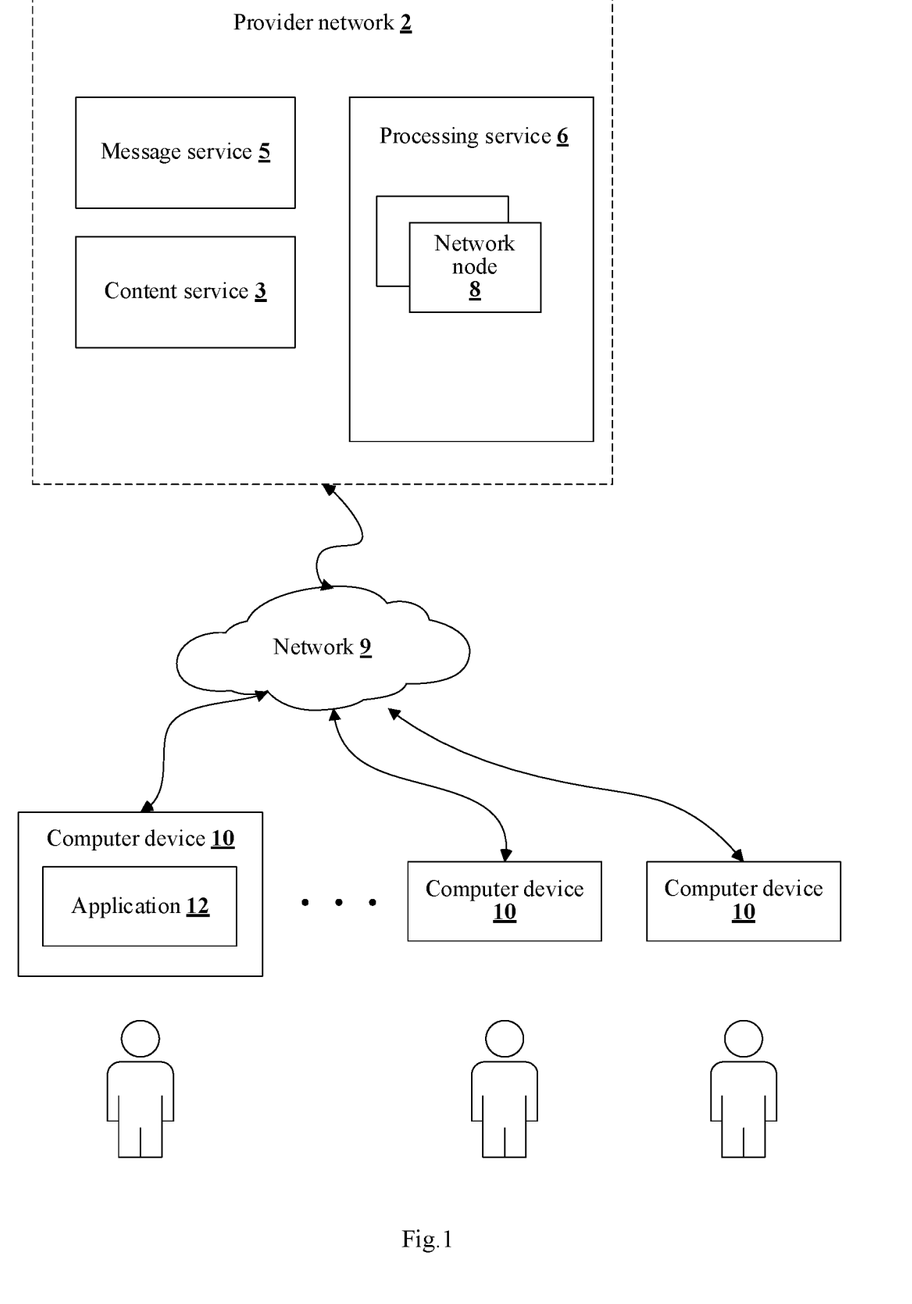
FIG. 1 schematically shows an application environment diagram of a WeChat mini program based bullet comment processing method according to an embodiment of the present application.

FIG. 1 schematically shows an environment application schematic diagram of the WeChat mini program based bullet comment processing method according to an embodiment of the present application.

A provider network 2 may be connected to a plurality of computer devices 10 through a network 9. In some embodiments, a content service 3 is provided by the provider network 2. In other embodiments, the content service 3 may be provided by an independent content provider connected with the provider network 2.

The content service 3 may include a content streaming service such as an Internet protocol video streaming service. The content streaming service may be configured to distribute content by various transmission technologies. The content service 3 may be configured to provide content such as videos, audio, text data, and a combination thereof. The content may include content streams (for example, video streams, audio streams, and information streams), content files (for example, video files, audio files, and text files), and/or other data.

The provider network 2 may implement a bullet comment service. The bullet comment service is configured to allow a user to make comments and/or share comments associated with content. Bullet comment content may be presented on the same screen together with the content. For example, the bullet comment content may be displayed in an overlay image above the content. The bullet comment content may be displayed with an animation effect. For example, the bullet comment content may be displayed as the content scrolling (for example, from right to left, from left to right, from top to bottom, and from bottom to top), and this animation effect may be achieved based on transition attributes of cascading style sheets 3 (CSS3).

The provider network 2 may be located in a data center, for example, a single site, or distributed at different geographical locations (for example, on a plurality of sites). The provider network 2 may provide services via one or more networks 9. The network 9 includes various network devices, for example, routers, switches, multiplexers, hubs, modems, network bridges, repeaters, firewalls, proxy devices, and/or the like. The network 9 may include physical links, for example, coaxial cable links, twisted pair cable links, optical fiber links, and a combination thereof. The network 9 may include wireless links, for example, cellular links, satellite links, and Wi-Fi links.

The provider network 2 may include a message service 5. The message service 5 may be configured to receive a plurality of messages. The plurality of messages may include a plurality of bullet comment content associated with the content and information related to the plurality of bullet comment content.

The message service 5 may be configured to manage messages used for various content items. The user may browse the content and access different content items to view comments on specific content, for example, comments posted by other users on the specific content. A comment, associated with a specific content item, from a user, may be output to other users viewing the specific content item. For example, all users accessing a content item (for example, a video editing) may view comments associated with the content item. The input bullet comment content may be output in real time or almost in real time.

The message service 5 may be configured to process the plurality of messages. The message service 5 may queue the plurality of messages or prioritize them in other manners based on information (for example, timestamps and incremental identifiers) associated with the corresponding bullet comment content. The message service 5 may be configured to process the plurality of messages using load balancing. For example, the message service 5 may be configured to use one or more of a plurality of processing nodes to process the plurality of messages, prioritize the messages, and perform load balancing on the messages. The message service 5 may at least temporarily store the plurality of messages. The message service 5 may store the plurality of messages in a data store such as a database.

The message service 5 may be configured to process the messages by performing a grouping process. The grouping process may include grouping of the plurality of messages based on features. If two messages have same features or fall within a threshold range of the features, the two messages may be grouped together. Messages associated with a specific content item (for example, a stream, a file, a program, a movie, a song, and a game session) may be associated with a same group. For example, a message may include or be associated with a content identifier. The content identifier may uniquely identify a content item. If the content identifier is found in a message or is associated with a message (for example, is sent separately), the message service 5 may associate the message with a group associated with the content item.

The message service 5 may perform natural language processing, topic identification, pattern identification, artificial intelligence, etc. to automatically determine a feature of a message and/or group the message. As an example, a phrase or a pattern which frequently appears may be identified as a topic. As another example, a database of a topic associated with content may be maintained. The topic may include a genre (for example, an action, a drama, and a comedy), a personality (for example, an actor, an actress, and a director), a language, etc. Messages may be grouped based on a feature of the client device and/or the user sending the messages. Demography, interest, history, and/or the like may be stored for a plurality of users to determine potential groups of messages.

The message service 5 may be further configured to process the messages by generating output data. The output data may include an instruction for outputting a comment based on corresponding context. The output data may include application data for indicating the application to overlay comment based on the context. The output data may include an instruction for generating (for example, encoding) content corresponding to the comment.

The output data may be used to generate (for example, encode) output bullet comment content, for example, output content streams. The output comment content may be combined (for example, multiplexed) with an original content item, for example, content provided by the content service 3. The obtained combination may include content in a single package (for example, a container, a transport container, and a transport stream). The package may include the original content item and the output bullet comment content (for example, displayed on the top of the original content item).

The message service 5 may be further configured to process the messages by performing a filtering process. The filtering process may include rejecting or marking messages matching a filtering criterion. The filtering criterion may specify a term and/or a phrase, for example, profanity, a hate comment, and an indecent comment. The filtering criterion may specify a character, for example, a symbol or a font. The filtering criterion may specify a language, a computer-readable code mode, and etc.

The provider network 2 may further include a processing service 6. The processing service 6 may be configured to provide processing for various services, for example, a service of the provider network 2. The processing service 6 may include a plurality of network nodes 8. The plurality of network nodes 8 may process tasks associated with the message service 5. The plurality of network nodes 8 may be implemented as one or more computing devices, one or more processors, one or more virtual computing instances, a combination thereof, and/or the like.

The plurality of network nodes 8 may be implemented by one or more computing devices. The one or more computing devices may include a virtualized computing instance. The virtualized computing instance may include a virtual machine, for example, a simulation of a computer system, an operating system, or a server. The computing device may be used for other data of specific software (for example, an operating system, a dedicated application, or a server) for simulation based on a virtual image and/or definition, and the virtual machine is loaded by the computing device. As requirements on different types of processing services change, different virtual machines may be loaded and/or terminated on the one or more computing devices. A hypervisor may be implemented to manage use of different virtual machines on the same computing device.

In some embodiments, the plurality of network nodes 8 may process events submitted by a plurality of computer devices. These events may be associated with discussions on real-time news, videos, social hotspots, reports on some user accounts, etc. In other embodiments, the plurality of network nodes 8 may process performance evaluation of a plurality of user accounts for reviewing events in a network community. In some implementations, these services may be implemented as dedicated computing devices, dedicated processors, dedicated virtual machine instances, and/or the like. In other implementations, various nodes may implement any function associated with these services.

The plurality of computer devices 10 may be configured to access content and a service of the provider network 2. The plurality of computer devices 10 may include any type of electronic devices, for example, mobile devices, tablet devices, laptop computers, workstations, virtual reality devices, game devices, set-top boxes, digital streaming media devices, vehicle terminals, smart televisions, set-top boxes, and e-book readers, etc.

The plurality of computer devices 10 may be associated with one or more users. A single user may access the provider network 2 using one or more of the plurality of computer devices 10. The plurality of computer devices 10 may travel to various positions and use different networks to access the provider network 2.

The computer device 10 may include an application 12. The application 12 outputs (for example, displays, renders, or presents) content to a user. The application 12 may be a video client (for example, a Bilibili client), a browser client, a WeChat-based WeChat mini program, etc. The content may include a video, audio, bullet comment content, and/or the like. The bullet comment content may be words, emojis, patterns, etc., and may have different colors, sizes, animations, scrolling directions, etc.

As an example, the application 12 may send reports on some users to the processing service, and the application 12 may also send remarks on the reports to the processing service 6. Events or remarks sent from the plurality of computer devices 10 include reasons for submitting the events, content attributes associated with the events, user account information, etc.

Embodiment 1

Figure 2:
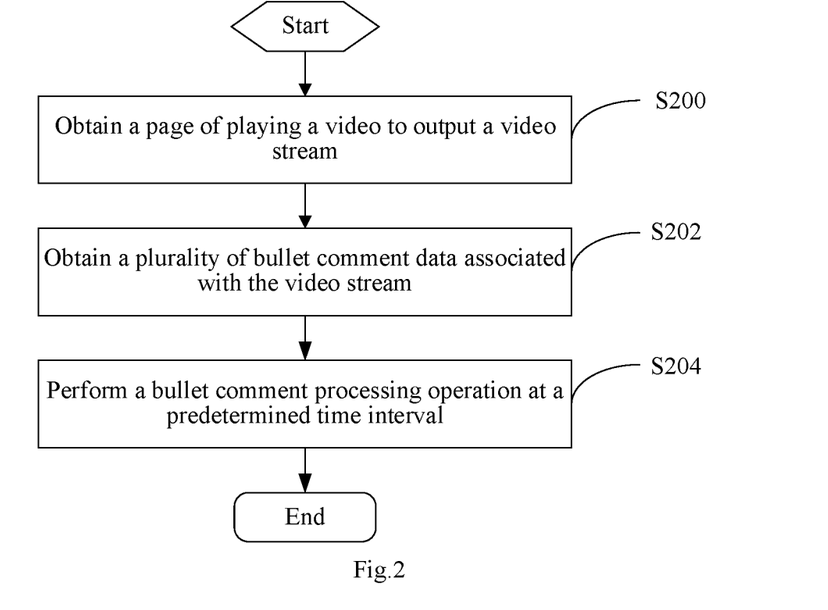
FIG. 2 schematically shows a flowchart of a WeChat mini program based bullet comment processing method according to Embodiment 1 of the present application.

FIG. 2 schematically shows a flowchart of a WeChat mini program based bullet comment processing method according to Embodiment 1 of the present application. It can be understood that this method embodiment may be executed in a computer device 10, and the flowchart of this method embodiment is not used to limit an order of executing steps.

As shown in FIG. 2, the WeChat mini program based bullet comment processing method may include steps S200 to S204, where:

In step S200, a page of playing a video is obtained to output a video stream.

The video playback page is a WeChat mini program framework based page.

The video playback page includes a logical layer and a view layer, where the logical layer includes a bullet comment loader, a bullet comment calculator, and a bullet comment timeline. The bullet comment loader is responsible for operations such as requesting, compiling, and parsing bullet comment data, the bullet comment calculator for operations such as traversal search of bullet comment data, and the bullet comment timeline for updating a timeline.

In step S202, a plurality of bullet comment data associated with the video stream are obtained.

In an exemplary embodiment, the plurality of bullet comment data may be original bullet comment data.

In some other embodiments, the plurality of bullet comment data may alternatively be bullet comment data obtained by cloning a plurality of original bullet comment data. Specifically, the computer device 10 initiates a bullet comment obtaining request to the provider network 2 by the bullet comment loader, and receives the plurality of original bullet comment data returned by the provider network 2. Then, the plurality of original bullet comment data are cloned. The plurality of original bullet comment data are not used for bullet comment display, and the plurality of bullet comment data are used for bullet comment display.

The plurality of original bullet comment data and the plurality of bullet comment data are information consistent, and are stored in an array format.

For example, each bullet comment data may include the following information:

```
{
    stime, // Time of posting in a video in units of second
        mode,// Mode of a bullet comment
        size,// Size of bullet comment text
        color, // Color of bullet comment text
        date, // Creation date of a bullet comment
        class, // Class name of a bullet comment
    uid, // id of a user that creates a bullet comment
    dmid, // Bullet comment id
        text, // Text content of a bullet comment
        duration, // Duration of a bullet comment
        border, // Whether a bullet comment has a border
    borderColor, // Color of a bullet comment border
        style, // Interline style of bullet comments
}
```

Because the video playback page is a WeChat mini program framework based page, which includes a logical layer and a view layer, and in which communication between the logical layer and the view layer is asynchronous. The asynchronous communication is prone to cause bugs when the plurality of bullet comments are processed. To solve the problem, in this embodiment, a single-thread block mechanism is simulated. A specific step for implementation is as follows:

In step S204, a bullet comment processing operation is performed with a predetermined time interval, where the bullet comment processing operation includes performing bullet comment processing at a logical layer on the plurality of bullet comment data.

It can be understood that a balanced time interval may be set as the predetermined time interval on the basis of hardware resources (for example, CPU performance and a screen refresh rate) of the computer device 10, to regularly perform a bullet comment processing operation, so that smoothness of displaying bullet comments and proper use of computing resources are ensured, thereby avoiding various problems caused by a bullet comment processing operation being performed in an irregular state, for example, displaying of bullet comments is not smooth or excessive computing resources are used.

Figure 3:
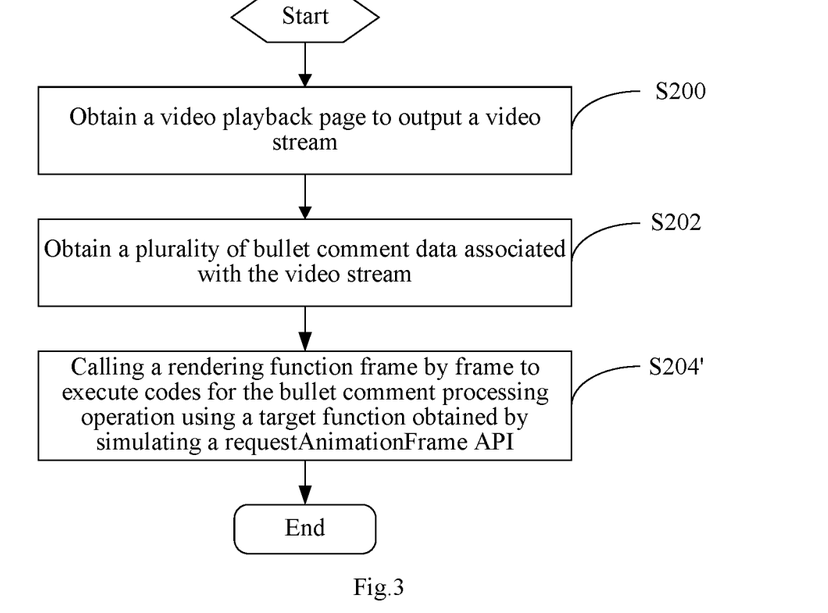
FIG. 3 schematically shows another flowchart of a WeChat mini program based bullet comment processing method according to Embodiment 1 of the present application.

It should be understood that, to ensure bullet comment displaying with no frame freezing, a code needs to be executed a maximum number of times with no performance wastes or frame drops. If the number of times of executing the code is not large enough, frame drops may occur; but if the number of times of executing the code is too large, problems such as excessively high CPU occupation or performance wastes may occur. In the embodiments, a bullet comment processing operation is optimized through simulation of requestAnimationFrame. The specific steps are as follows:

As shown in FIG. 3, performing a bullet comment processing operation at a predetermined time interval may include step S204' of using a target function obtained by simulating a requestAnimationFrame API to call a rendering function frame by frame to execute codes for the bullet comment processing operation.

The target function includes a timing function and a callback function, where a time parameter in the timing function is determined according to a screen refresh rate, the target function is recursively called, and the callback function is used to call the rendering function to perform bullet comment processing operations.

As a specific example: a custom target function may be encapsulated, which target function receives a callback function, and records system time every 16.7 milliseconds using a setTimeout API. The callback function is allowed only when the last time for calling is longer than 16.7 milliseconds. Then, the encapsulated function is recursively called, and the rendering function is passed in as a callback, thereby achieving an effect of simulated requestAnimationFrame. The following effects are achieved in a frame-by-frame and recursive-calling principle: a code is executable a maximum number of times without performance wastes or frame drops. That is, within the same time, the code is executed as many times as possible without affecting performance, to ensure a good user experience.

It should be noted that the findings are obtained by the inventor through deep research, and cannot be easily obtained by those skilled in the art. Although requestAnimationFrame simulation is used in the embodiments, there are great differences between performing a bullet comment processing operation by using a target function and performing a rendering operation by using the requestAnimationFrame. For example, usages of the target function and requestAnimationFrame are completely different. Analysis thereof is as follows:

The requestAnimationFrame is used in conventional browsers, and the principle thereof lies in synchronization with a screen refresh rate, where repaint is performed on a canvas about every 16.7 seconds.

The target function is used for a bullet comment processing operation at a logical layer in a WeChat mini program page.

The following describes the bullet comment processing operations in detail.

Figure 4:
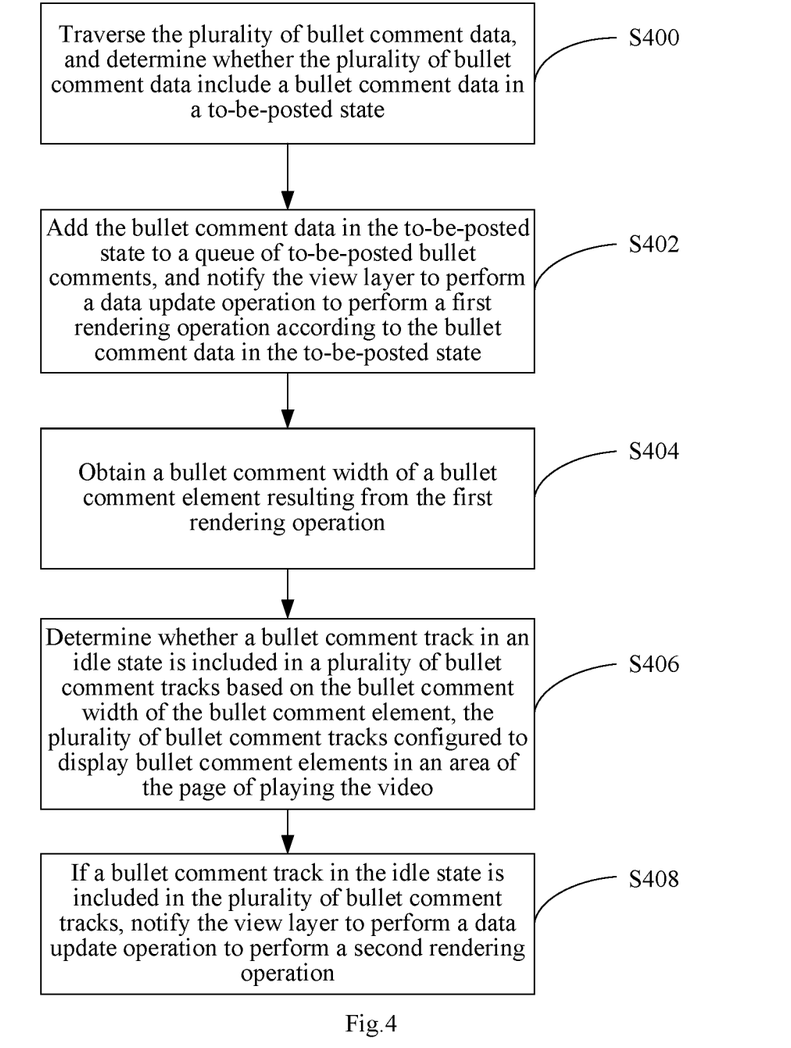
FIG. 4 schematically shows sub-steps of step S204 in FIG. 2.

In an exemplary embodiment, as shown in FIG. 4, the bullet comment processing operation may include the following operations: in step S400, the plurality of bullet comment data are traversed, to determine whether the plurality of bullet comment data include a bullet comment data in a to-be-posted state; in step S402, if the plurality of bullet comment data include the bullet comment data in the to-be-posted state, the bullet comment data in the to-be-posted state is added to a queue of to-be-posted bullet comments, and the view layer is notified to perform a data update operation, to perform a first rendering operation according to the bullet comment data in the to-be-posted state. The first rendering operation includes inserting real bullet comment elements outside a view area, which are invisible to a user and without added motion effects. Such an operation aims at facilitating subsequent obtaining of the real bullet comment width of the bullet comment element so as for calculating an initial position of the movement and an end position of the movement of a bullet comment, and for determining, based at least thereon, whether there is a bullet comment track in an idle state in a plurality of bullet comment tracks. In step S404, a bullet comment width of a bullet comment element resulting from the first rendering operation is obtained. In step S406, whether a bullet comment track in an idle state is included in a plurality of bullet comment tracks is determined according to the bullet comment width of the bullet comment element, the plurality of bullet comment tracks configured to display bullet comment elements in an area of the page of playing the video. In step S408, if a bullet comment track in the idle state is included in the plurality of bullet comment tracks, the view layer is notified to perform a data update operation, to perform a second rendering operation. A bullet comment element resulting from the second rendering operation is configured to be displayed on the page of playing the video. The second rendering operation includes data binding on the bullet comment speed, the bullet comment width, the bullet comment content, the motion effect, and the like of the bullet comment element, and notifying the view layer to further render a corresponding bullet comment element according to the bound data. If the plurality of bullet comment tracks do not include a bullet comment track in the idle state, which means that there are too many bullet comments at present, the bullet comment data in the to-be-posted state is discarded from the queue of to-be-posted bullet comments.

Figure 5:
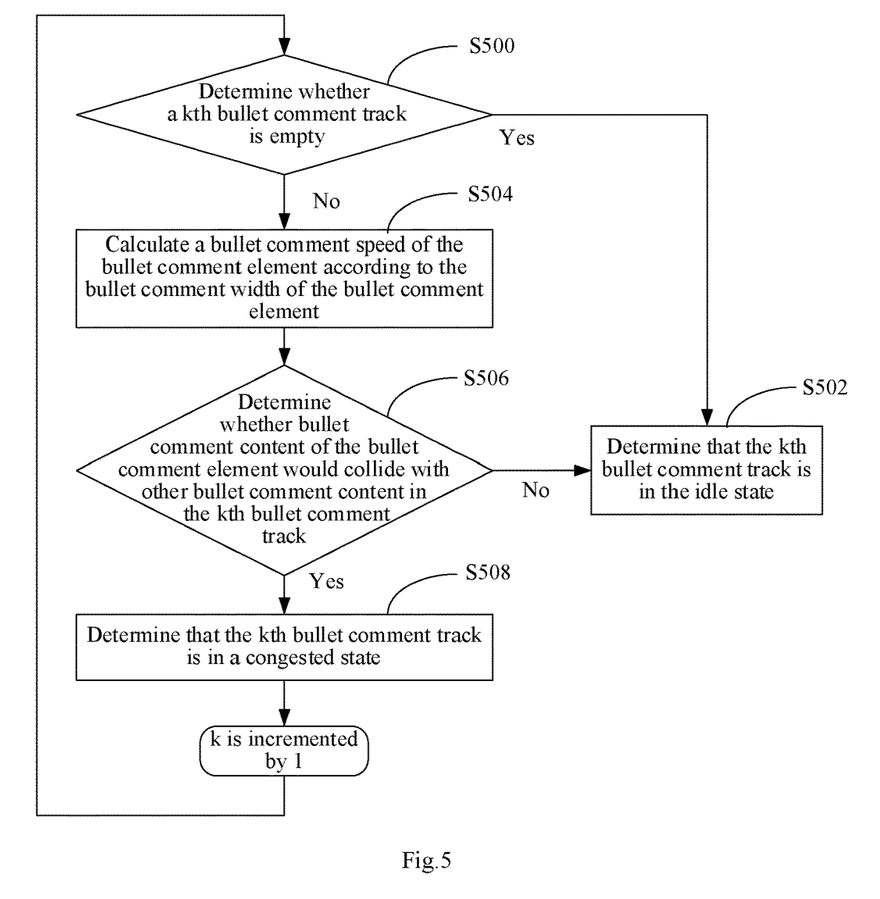
FIG. 5 schematically shows sub-steps of step S406 in FIG. 4.

It can be understood that there may be a plurality of manners of determining whether a bullet comment track in the idle state is included in the plurality of bullet comment tracks. For example, as shown in FIG. 5, whether each bullet comment track is in the idle state may be determined through steps as follows: In step S500, whether a $k^{th}$ bullet comment track is empty is determined. If the $k^{th}$ bullet comment track is empty, the process proceeds to step S502, otherwise, the process proceeds to step S504. In step S502, it is determined that the $k^{th}$ bullet comment track is in the idle state. In step S504, a bullet comment speed of the bullet comment element moving on the page of playing the video is calculated according to the bullet comment width of the bullet comment element. In step S506, whether bullet comment content of the bullet comment element would collide with other bullet comment content displayed in the $k^{th}$ bullet comment track is determined according to the bullet comment speed and bullet comment posting time of the bullet comment element. If the bullet comment content of the bullet comment elements would collide with other bullet comment content in the $k^{th}$ bullet comment track, the process proceeds to step S502, otherwise, the process proceeds to step S508. In step S508, it is determined that the $k^{th}$ bullet comment track is in a congested state.

In an exemplary embodiment, the bullet comment processing operation may include the following operations: performing an update operation on a timeline of the bullet comment timeline, to ensure synchronization of the bullet comment timeline and current playing time of a video stream.

Certainly, the bullet comment processing operation may include some other operations, for example: traversing the plurality of bullet comment data, to query whether the plurality of bullet comment data include a bullet comment data in a to-be-expired state, and if the bullet comment data in the to-be-expired state is included, deleting the bullet comment data in the to-be-expired state, to reduce the number of subsequent traversals.

Figure 6:
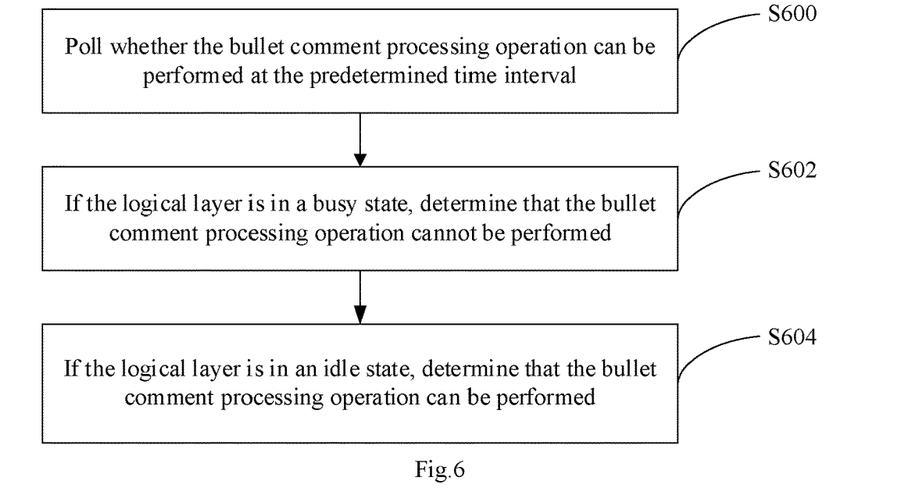
FIG. 6 schematically shows another additional step in FIG. 2.

In an exemplary embodiment, as shown in FIG. 6, step S204 may further include steps S600 to S604: In step S600, whether the bullet comment processing operation can be performed is polled at the predetermined time interval; In step S602, if the logical layer is in a busy state, it is determined that the bullet comment processing operation cannot be performed; In step S604, if the logical layer is in an idle state, it is determined that the bullet comment processing operation can be performed.

Because communication between a logical layer and a view layer (used to perform a rendering operation) of a WeChat mini program is asynchronous, operations such as the rendering operation, a bullet comment element information obtaining operation, and the like are all asynchronous operations. In a process of performing these asynchronous operations, if another operation is added, unpredictable bugs are prone to be caused. Therefore, when a bullet comment processing operation is performed, the busy state is identified. For example, in an $i^{th}$ polling, when an identifier indicating the busy state is detected, a new round of bullet comment processing operations are not started, but an $(i+1)^{th}$ polling is performed after waiting 16.7 milliseconds for instance, until an identifier indicating the idle state is detected, and a new round of bullet comment processing operations are started. By using an identifier to allow or block a subsequent operation, it is ensured that each bullet comment processing operation is performed after a previous bullet comment processing operation has been completed, and that the former bullet comment processing operation is not affected by the latter bullet comment processing operation, thereby avoiding unpredictable bugs.

Figure 7:
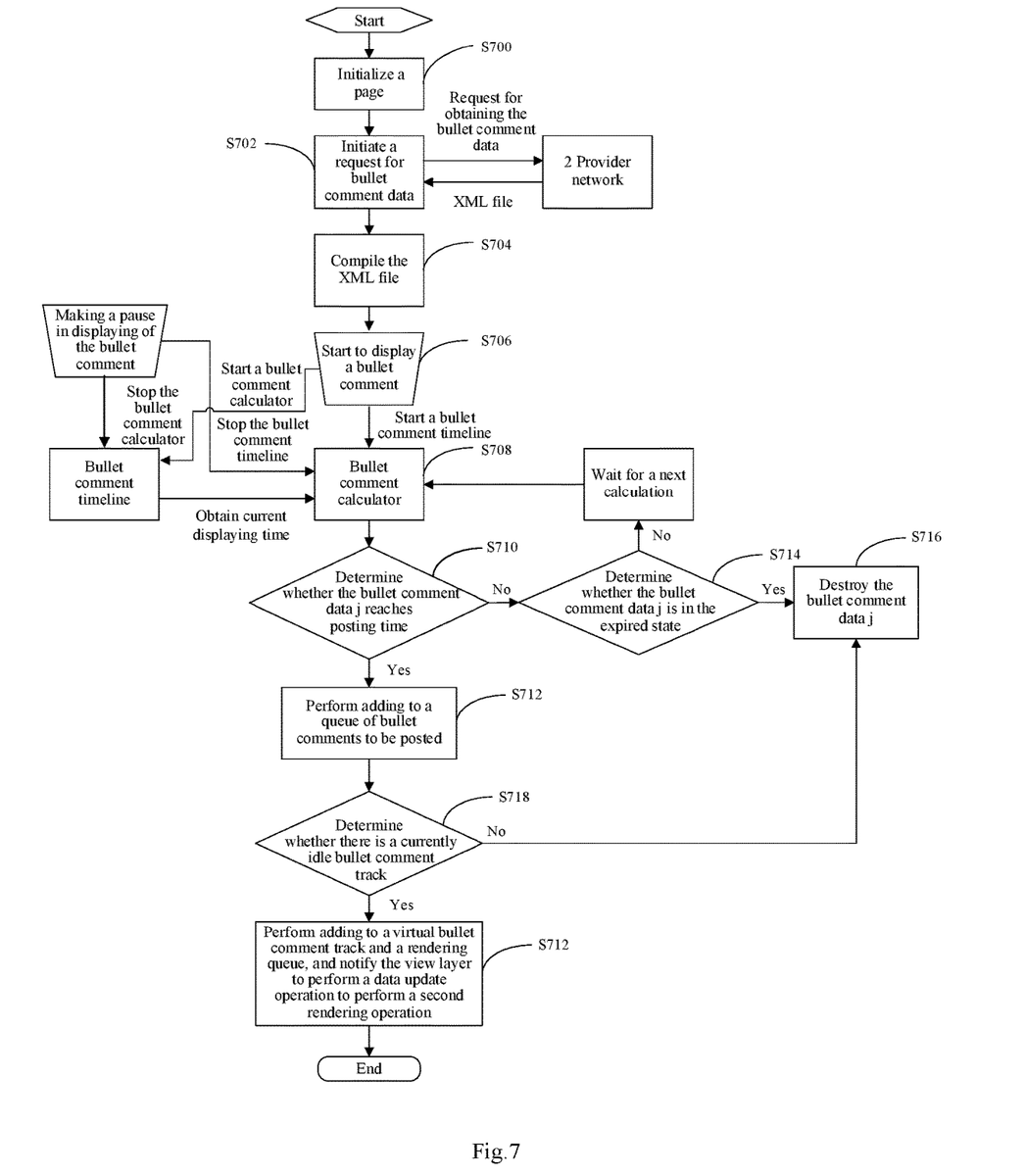
FIG. 7 schematically shows another flowchart of a WeChat mini program based bullet comment processing method according to Embodiment 1 of the present application.

As shown in FIG. 7, the following provides a specific example for better understanding. It should be noted that this example is not used to limit the protection scope of the patent.

In step S700, an initialization operation is performed on a WeChat mini program page.

In step S702, a request for bullet comment data is initiated.

After the initialization of the WeChat mini program page, a bullet comment loader initiates the request for the bullet comment data to a provider network 2, and receives an extensible markup language (XML) file returned by the provider network 2.

The bullet comment loader is located at a logical layer of the WeChat mini program page. The logical layer also includes a bullet comment calculator and a bullet comment timeline.

In step S704, the XML file is compiled to obtain a plurality of bullet comment data.

Specifically, the XML file is compiled into an Element object, a plurality of bullet comment data, for example, attributes (bullet comment data) such as bullet comment content, posting time, a bullet comment color, and moving time are obtained from the Element object, and these attributes are converted into a json data format and stored in a local array, to obtain a plurality of bullet comment data stored in the local array.

The plurality of bullet comment data may be used for bullet comment display; or may be used as original data, and not used for bullet comment display, where for example, the plurality of bullet comment data may be cloned, and a plurality of bullet comment data resulting from cloning are used for bullet comment display.

In this example, the plurality of bullet comment data are used for bullet comment display.

In step S706, a bullet comment starts to be displayed:

using a target function obtained by simulating a requestAnimationFrame to call a rendering function frame by frame to execute codes for the bullet comment processing operation, where each round of executing the code may be divided into steps S708 to S720 as follows.

In step S708, each bullet comment data is traversed by the bullet comment calculator to perform calculation and filtering on whether each bullet comment data is in a to-be-posted state or in an expired state.

The following takes one piece of bullet comment data j therein as an example:

In step S710, it is determined whether a posting time for the bullet comment data j has arrived. If the posting time for the bullet comment data j has arrived, the process proceeds to step S712, otherwise, the process proceeds to step S714.

According to current playing time of a video stream and the posting time in the bullet comment data j, whether bullet comment content in the posting time for the bullet comment data j has arrived is determined, that is, whether the bullet comment data j is in the to-be-posted state at present is determined.

In step S712, the bullet comment data j is added to the queue of to-be-posted bullet comments, and the view layer is notified to perform a data update operation to perform a first rendering operation. The process proceeds to step S718.

The view layer is notified to perform the data update operation to perform the first rendering operation according to the bullet comment data in the to-be-posted state.

For example, real bullet comment elements are inserted outside a view area, which are invisible to a user and without added motion effects. Such an operation aims at obtaining the real bullet comment width of the bullet comment element for calculating an initial position of the movement and an end position of the movement of a bullet comment, and for determining, based at least thereon, whether there is a bullet comment track in an idle state in a plurality of bullet comment tracks.

The bullet comment data j added to the queue of to-be-posted bullet comments may be deleted from the plurality of bullet comment data to reduce the number of subsequent traversals.

In step S714, whether the bullet comment data j is in the expired state is determined. If the bullet comment data j is in the expired state, the process proceeds to step S716, otherwise, the bullet comment data j waits for a next traversal operation.

In step S716, the bullet comment data j is destroyed. For example, the bullet comment data j is deleted from the plurality of bullet comment data to reduce the number of subsequent traversals.

In step S718, whether there is an idle bullet comment track at present is determined. If there is an idle bullet comment track, the process proceeds to step S720, otherwise, the process proceeds to step S716.

Exemplarily, a bullet comment width of a bullet comment element resulting from the first rendering operation is obtained. Whether the plurality of bullet comment tracks include a bullet comment track in the idle state is determined according to the bullet comment width of the bullet comment element.

Assuming that posting time and moving time of the last bullet comment content in the $k^{th}$ bullet comment track are $t_1$ and $t_2$ respectively, and then the time for the last bullet comment content completely disappearing from the bullet comment displaying area (the view area) is $t_1+t_2$, and that the posting time, the moving time, and the bullet comment width of the bullet comment data j and the displaying width of the bullet comment displaying area are $t_3$, $t_4$, $w_2$, and $w_1$, respectively, a moving speed of the bullet comment data j may be $s_1=(w_1+w_2)/t_4$. Therefore, it may be concluded that time when the bullet comment content of the bullet comment data j reaches the left boundary of the bullet comment displaying area for the first time is $t_3+(w_1/s_1)$. In a case that $t_1+t_2<t_3+(w_r/s_r)$, it is indicated that when the last bullet comment content completely disappears from the bullet comment displaying area, the bullet comment content in the bullet comment data j still has not caught up with the last bullet comment content, which means that the last bullet comment content will not collide with the bullet comment content in the bullet comment data j, and therefore, it may be determined that the current state of the $k^{th}$ bullet comment track is the idle state.

In step S720, adding is performed to a virtual bullet comment track and a rendering list, and the view layer is notified to perform a data update operation to perform a second rendering operation.

(1) The bullet comment data j in the queue of to-be-posted bullet comments is added to the virtual bullet comment track. The virtual bullet comment track is used for determining whether each bullet comment track is in the idle state.

(2) The bullet comment data j in the queue of to-be-posted bullet comments is added to the rendering list to further create a corresponding bullet comment element such as a motion effect.

Embodiment 2

Figure 8:
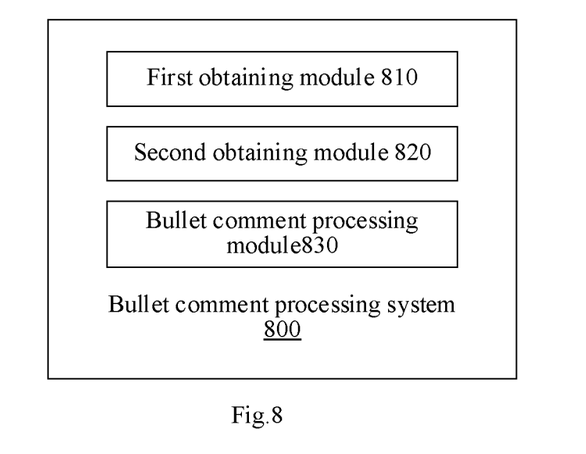
FIG. 8 schematically shows a block diagram of a communication system according to Embodiment 2 of the present application.

FIG. 8 schematically shows a block diagram of a WeChat mini program based bullet comment processing system according to Embodiment 2 of the present application. The WeChat mini program based bullet comment processing system may be divided into one or more program modules, and the one or more program modules are stored in a storage medium and executed by one or more processors to implement the embodiments of the present application. The program modules referred to in the embodiments of the present application denote a series of computer-readable instruction segments that can complete specific functions. The functions of various program modules in the embodiments will be specifically described in the following descriptions.

As shown in FIG. 8, the system 800 for bullet comment processing based on a WeChat mini program may include a first obtaining module 810, a second obtaining module 820, and a bullet comment processing module 830.

The first obtaining module 810 is used to obtain a video playback page for outputting a video stream.

The second obtaining module 820 is used to obtain a plurality of bullet comment data associated with the video stream.

The bullet comment processing module 830 is used to perform a bullet comment processing operation at a predetermined time interval, where the bullet comment processing operation includes performing bullet comment processing at a logical layer on the plurality of bullet comment data.

In an exemplary embodiment, performing a bullet comment processing operation at a predetermined time interval includes: using a target function obtained by simulating a requestAnimationFrame to call a rendering function frame by frame to execute the code of the bullet comment processing operation.

In an exemplary embodiment, the target function includes a timing function and a callback function, where the time parameter in the timing function is determined according to a screen refresh rate, the target function is recursively called, and the callback function is used to call the rendering function to perform the bullet comment processing operation.

In an exemplary embodiment, performing a bullet comment processing operation at a predetermined time interval includes: polling, at the predetermined time interval, whether the bullet comment processing operation can be performed; and if the logical layer is in a busy state, determining that the bullet comment processing operation cannot be performed; or if the logical layer is in an idle state, determining that the bullet comment processing operation can be performed.

In an exemplary embodiment, the bullet comment processing operation includes: traversing the plurality of bullet comment data to query whether the plurality of bullet comment data include a bullet comment data in a to-be-posted state; if the plurality of bullet comment data include the bullet comment data in the to-be-posted state, then: adding the bullet comment data in the to-be-posted state to a queue of to-be-posted bullet comments, and notifying the view layer to perform a data update operation, to perform a first rendering operation according to the bullet comment data in the to-be-posted state; obtaining a bullet comment width of a bullet comment element resulting from the first rendering operation; determining, according to the bullet comment width of the bullet comment element, whether a bullet comment track in an idle state is included in a plurality of bullet comment tracks; and if a bullet comment track in the idle state is included in the plurality of bullet comment tracks, performing data binding on the bullet comment element, to notify the view layer to perform a data update operation to perform a second rendering operation, where a bullet comment element resulting from the second rendering operation is used for bullet comment display.

In an exemplary embodiment, the determining, according to the bullet comment width of the bullet comment element, whether a bullet comment track in an idle state is included in a plurality of bullet comment tracks includes: determining whether a $k^{th}$ bullet comment track is empty, where k is a positive integer starting from 1; if the $k^{th}$ bullet comment track is empty, determining that the $k^{th}$ bullet comment track is in the idle state; if the $k^{th}$ bullet comment track is not empty, calculating a bullet comment speed of the bullet comment element according to the bullet comment width of the bullet comment element; determining, according to the bullet comment speed of the bullet comment element, whether bullet comment content of the bullet comment element would collide with other bullet comment content in the $k^{th}$ bullet comment track; and if the bullet comment content of the bullet comment element would not collide with other bullet comment content in the $k^{th}$ bullet comment, determining that the $k^{th}$ bullet comment track is in the idle state; and if the bullet comment content of the bullet comment element would collide with other bullet comment content in the $k^{th}$ bullet comment track, determining that the $k^{th}$ bullet comment track is in a congested state.

In an exemplary embodiment, the logical layer includes a bullet comment timeline, and the bullet comment processing operation further includes: performing an update operation on a timeline of the bullet comment timeline.

Embodiment 3

Figure 9:
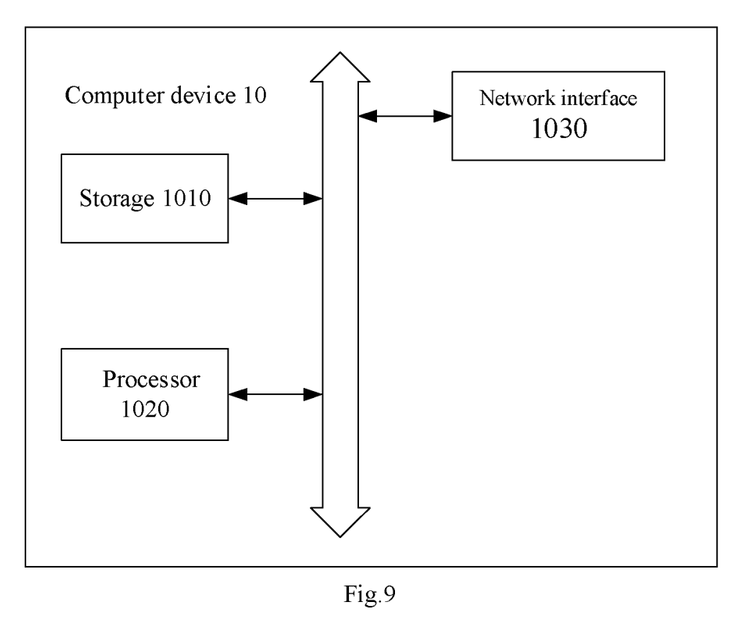
FIG. 9 schematically shows a hardware architecture schematic diagram of a computer device suitable for implementing a WeChat mini program based bullet comment processing method according to Embodiment 3 of the present application.

FIG. 9 schematically shows a hardware architecture schematic diagram of a computer device suitable for implementing a WeChat mini program based bullet comment processing method according to Embodiment 3 of the present application. In this embodiment, a computer device 10 is a device that may automatically perform numerical calculation and/or information processing according to preset or pre-stored instructions. The computer device 10 may be, for example, a smartphone, a computer, a projector, a set-top box, etc., or may be a virtual machine host process and one or more virtual machine instances, or a rack server, a blade server, a tower server, or a cabinet server (including an independent server or a server cluster composed of a plurality of servers), etc. As shown in FIG. 9, the computer device 10 at least includes, but is not limited to, a storage 1010, a processor 1020, and a network interface 1030, which may be communicatively connected to each other through a system bus. In the modules:

the storage 1010 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the storage 1010 may be an internal storage module of the computer device 10, for example, a hard disk or a memory of the computer device 10. In some other embodiments, the storage 1010 may alternatively be an external storage device of the computer device 10, for example, a plug-in hard disk disposed on the computer device 10, a smart media card (SMC for short), a secure digital (SD for short) card, and a flash card. Certainly, the storage 1010 may include both the internal storage module of the computer device 10 and the external storage device thereof. In this embodiment, the storage 1010 is generally used to store an operating system and various application software installed in the computer device 10, such as program codes for a WeChat mini program based bullet comment processing method. In addition, the storage 1010 may be used to temporarily store various types of data that has been output or will be output.

The processor 1020 may be, in some embodiments, a central processing unit (CPU for short), a controller, a microcontroller, a microprocessor, or other data processing chips. The processor 1020 is generally used to control overall operation of the computer device 10, for example, executing control, processing, etc. related to data exchange or communication with the computer device 10. In this embodiment, the processor 1020 is used to run program codes stored in the storage 1010 or process data.

The network interface 1030 may include a wireless network interface or a wired network interface, and the network interface 1030 is generally used to establish a communication connection between the computer device 10 and other computer devices. For example, the network interface 1030 is used to connect the computer device 10 to an external terminal through a network, and establish a data transmission channel, a communication link, etc. between the computer device 10 and the external terminal. The network may be a wireless, such as Intranet, Internet, the Global System for Mobile Communications (GSM for short), Wideband Code Division Multiple Access (WCDMA for short), a 4G network, a 5G network, Bluetooth, Wi-Fi, or other wireless or wired networks.

It should be noted that FIG. 9 shows only a computer device with components 1010 to 1030, but it should be understood that not all of the illustrated components are required to be implemented, and more or fewer components may be alternatively implemented.

In this embodiment, the WeChat mini program based bullet comment processing method stored in the storage 1010 may be further divided into one or more program modules and executed by one or more processors (by the processor 1020 in this embodiment) to implement the present application.

Embodiment 4

This embodiment further provides a computer-readable storage medium having stored thereon computer-readable instructions, where when the computer-readable instructions are executed by a processor, the following steps are implemented: obtaining a video playback page for outputting a video stream; obtaining a plurality of bullet comment data associated with the video stream; and performing a bullet comment processing operation at a predetermined time interval, where the bullet comment processing operation includes performing bullet comment processing at a logical layer on the plurality of bullet comment data.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card. Certainly, the computer-readable storage medium may alternatively include both the internal storage unit of the computer device and the external storage device thereof. In this embodiment, the computer-readable storage medium is generally used to store an operating system and various application software installed in the computer device, such as program codes for a WeChat mini program based bullet comment processing method in the embodiments. In addition, the computer-readable storage medium may be used to temporarily store various types of data that has been output or will be output.

It will be apparent to those skilled in the art that the various modules or steps in the embodiments of the present application can be implemented by a general-purpose computing device that can be centralized on a single computing device or distributed across a network formed by a plurality of computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of processing bullet comments, comprising:
obtaining a page of playing a video for outputting a video stream;
obtaining a plurality of pieces of bullet comment data associated with the video stream; and
performing a bullet comment processing operation with a predetermined time interval, wherein the bullet comment processing operation comprises performing bullet comment processing on the plurality of pieces of bullet comment data at a logical layer, and wherein the performing a bullet comment processing operation with a predetermined time interval comprises:
calling a rendering function frame by frame to execute codes for the bullet comment processing operation using a target function obtained by simulating a requestAnimationFrame,
wherein the target function comprises a timing function and a callback function, wherein a time parameter in the timing function is determined based on a screen refresh rate, wherein the target function is recursively called, and wherein the callback function is configured to call the rendering function to perform the bullet comment processing operation.

2. The method of claim 1, wherein the performing a bullet comment processing operation with a predetermined time interval comprises:
polling, with the predetermined time interval, whether it is capable of performing the bullet comment processing operation;
in response to determining that the logical layer is in a busy state, determining that it is not capable of performing the bullet comment processing operation; and
in response to determining that the logical layer is in an idle state, determining that it is capable of performing the bullet comment processing operation.

3. The method of claim 1, wherein the performing bullet comment processing on the plurality of pieces of bullet comment data comprises:
traversing the plurality of pieces of bullet comment data and determining whether the plurality of pieces of bullet comment data comprise a piece of bullet comment data in a to-be-posted state;
in response to determining that the plurality of pieces of bullet comment data comprise the piece of bullet comment data in the to-be-posted state, the method further comprising:
adding the piece of bullet comment data in the to-be-posted state to a queue of bullet comments to-be-posted, and notifying a view layer to perform a data update operation to perform a first rendering operation based on the bullet comment data in the to-be-posted state;
obtaining a width of a bullet comment element corresponding to the piece of bullet comment data based on a result of the first rendering operation;
determining, based on the width of the bullet comment element, whether a plurality of bullet comment tracks comprise a bullet comment track in an idle state, the plurality of bullet comment tracks configured to display bullet comment elements in an area of the page of playing the video; and
in response to determining that the plurality of bullet comment tracks comprise the bullet comment track in the idle state, performing data binding on the bullet comment element, and notifying the view layer to perform another data update operation to perform a second rendering operation, wherein a bullet comment element resulting from the second rendering operation and corresponding to the piece of the bullet comment data is configured to be displayed on the page of playing the video.

4. The method of claim 3, wherein the determining, based on the width of the bullet comment element, whether a plurality of bullet comment tracks comprise a bullet comment track in an idle state comprises:
determining whether a $k^{th}$ bullet comment track is empty, wherein k represents a positive integer, and an initial value of k is 1;
in response to determining that the $k^{th}$ bullet comment track is empty, determining that the $k^{th}$ bullet comment track is in the idle state;
in response to determining that the $k^{th}$ bullet comment track is not empty, determining a bullet comment speed of the bullet comment element moving on the page of playing the video based on the width of the bullet comment element;
determining, based at least in part on the bullet comment speed of the bullet comment element, whether content of the bullet comment element corresponding to the piece of the bullet comment data collides with content of another bullet comment element displayed in the $k^{th}$ bullet comment track;
in response to determining that the content of the bullet comment element does not collide with the content of another bullet comment element in the $k^{th}$ bullet comment track, determining that the $k^{th}$ bullet comment track is in the idle state; and
in response to determining that the content of the bullet comment element collides with the content of another bullet comment element in the $k^{th}$ bullet comment track, determining that the $k^{th}$ bullet comment track is in a congested state.

5. The method of claim 1, wherein the logical layer comprises a bullet comment timeline, and wherein the bullet comment processing operation further comprises performing an update operation on a timeline of the bullet comment timeline.

6. A computer device, comprising a memory, a processor, and computer-readable instructions stored on the memory and executable by the processor, wherein upon executing the computer-readable instructions, the processor implements operations comprising:
obtaining a page of playing a video for outputting a video stream;
obtaining a plurality of pieces of bullet comment data associated with the video stream; and
performing a bullet comment processing operation with a predetermined time interval, wherein the bullet comment processing operation comprises performing bullet comment processing on the plurality of pieces of bullet comment data at a logical layer, and wherein the performing a bullet comment processing operation with a predetermined time interval comprises:
calling a rendering function frame by frame to execute codes for the bullet comment processing operation using a target function obtained by simulating a requestAnimationFrame,
wherein the target function comprises a timing function and a callback function, wherein a time parameter in the timing function is determined based on a screen refresh rate, wherein the target function is recursively called, and wherein the callback function is configured to call the rendering function to perform the bullet comment processing operation.

7. The computer device of claim 6, wherein the performing a bullet comment processing operation with a predetermined time interval comprises:
   polling, with the predetermined time interval, whether it is capable of performing the bullet comment processing operation;
   in response to determining that the logical layer is in a busy state, determining that it is not capable of performing the bullet comment processing operation; and
   in response to determining that the logical layer is in an idle state, determining that it is capable of performing the bullet comment processing operation.

8. The computer device of claim 6, wherein the performing bullet comment processing on the plurality of pieces of bullet comment data comprises:
   traversing the plurality of pieces of bullet comment data and determining whether the plurality of pieces of bullet comment data comprise a piece of bullet comment data in a to-be-posted state;
   in response to determining that the plurality of pieces of bullet comment data comprise the piece of bullet comment data in the to-be-posted state, the operations further comprising:
   adding the piece of bullet comment data in the to-be-posted state to a queue of bullet comments to-be-posted, and notifying a view layer to perform a data update operation to perform a first rendering operation based on the bullet comment data in the to-be-posted state;
   obtaining a width of a bullet comment element corresponding to the piece of bullet comment data based on a result of the first rendering operation;
   determining, based on the width of the bullet comment element, whether a plurality of bullet comment tracks comprise a bullet comment track in an idle state, the plurality of bullet comment tracks configured to display bullet comment elements in an area of the page of playing the video; and
   in response to determining that the plurality of bullet comment tracks comprise the bullet comment track in the idle state, performing data binding on the bullet comment element, and notifying the view layer to perform another data update operation to perform a second rendering operation, wherein a bullet comment element resulting from the second rendering operation and corresponding to the piece of the bullet comment data is configured to be displayed on the page of playing the video.

9. The computer device of claim 8, wherein the determining, based on the width of the bullet comment element, whether a plurality of bullet comment tracks comprise a bullet comment track in an idle state comprises:
   determining whether a $k^{th}$ bullet comment track is empty, wherein k represents a positive integer, and an initial value of k is 1;
   in response to determining that the $k^{th}$ bullet comment track is empty, determining that the $k^{th}$ bullet comment track is in the idle state;
   in response to determining that the $k^{th}$ bullet comment track is not empty, determining a bullet comment speed of the bullet comment element moving on the page of playing the video based on the width of the bullet comment element;
   determining, based at least in part on the bullet comment speed of the bullet comment element, whether content of the bullet comment element corresponding to the piece of the bullet comment data collides with content of another bullet comment element displayed in the $k^{th}$ bullet comment track;
   in response to determining that the content of the bullet comment element does not collide with the content of another bullet comment element in the $k^{th}$ bullet comment track, determining that the kill bullet comment track is in the idle state; and
   in response to determining that the content of the bullet comment element collides with the content of another bullet comment element in the $k^{th}$ bullet comment track, determining that the $k^{th}$ bullet comment track is in a congested state.

10. The computer device of claim 6, wherein the logical layer comprises a bullet comment timeline, and wherein the bullet comment processing operation further comprises performing an update operation on a timeline of the bullet comment timeline.

11. A non-transitory computer-readable storage medium having computer-readable instructions stored thereon, the computer-readable instructions are executable by at least one processor to cause the at least one processor to perform operations comprising:
   obtaining a page of playing a video for outputting a video stream;
   obtaining a plurality of pieces of bullet comment data associated with the video stream; and
   performing a bullet comment processing operation with a predetermined time interval, wherein the bullet comment processing operation comprises performing bullet comment processing on the plurality of pieces of bullet comment data at a logical layer, and wherein the performing a bullet comment processing operation with a predetermined time interval comprises:
   calling a rendering function frame by frame to execute codes for the bullet comment processing operation using a target function obtained by simulating a requestAnimationFrame,
   wherein the target function comprises a timing function and a callback function, wherein a time parameter in the timing function is determined based on a screen refresh rate, wherein the target function is recursively called, and wherein the callback function is configured to call the rendering function to perform the bullet comment processing operation.

12. The non-transitory computer-readable storage medium of claim 11, wherein the performing a bullet comment processing operation with a predetermined time interval comprises:
   polling, with the predetermined time interval, whether it is capable of performing the bullet comment processing operation;
   in response to determining that the logical layer is in a busy state, determining that it is not capable of performing the bullet comment processing operation; and
   in response to determining that the logical layer is in an idle state, determining that it is capable of performing the bullet comment processing operation.

13. The non-transitory computer-readable storage medium of claim 11, wherein the performing bullet comment processing on the plurality of pieces of bullet comment data comprises:
   traversing the plurality of pieces of bullet comment data and determining whether the plurality of pieces of bullet comment data comprise a piece of bullet comment data in a to-be-posted state;

in response to determining that the plurality of pieces of bullet comment data comprise the piece of bullet comment data in the to-be-posted state, the operations further comprising:

adding the piece of bullet comment data in the to-be-posted state to a queue of bullet comments to-be-posted, and notifying a view layer to perform a data update operation to perform a first rendering operation based on the bullet comment data in the to-be-posted state;

obtaining a width of a bullet comment element corresponding to the piece of bullet comment data based on a result of the first rendering operation;

determining, based on the width of the bullet comment element, whether a plurality of bullet comment tracks comprise a bullet comment track in an idle state, the plurality of bullet comment tracks configured to display bullet comment elements in an area of the page of playing the video; and in response to determining that the plurality of bullet comment tracks comprise the bullet comment track in the idle state, performing data binding on the bullet comment element, and notifying the view layer to perform another data update operation to perform a second rendering operation, wherein a bullet comment element resulting from the second rendering operation and corresponding to the piece of the bullet comment data is configured to be displayed on the page of playing the video.

* * * * *